United States Patent
Englund et al.

(10) Patent No.: US 11,132,439 B2
(45) Date of Patent: Sep. 28, 2021

(54) METHOD FOR MIGRATING AN ACTOR INSTANCE

(71) Applicant: Telefonaktiebolaget LM Ericsson (publ), Stockholm (SE)

(72) Inventors: Håkan Englund, Lund (SE); Christoffer Jerkeby, Tyresö (SE); Bernard Smeets, Dalby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 237 days.

(21) Appl. No.: 16/463,955

(22) PCT Filed: Nov. 30, 2016

(86) PCT No.: PCT/EP2016/079271
§ 371 (c)(1),
(2) Date: May 24, 2019

(87) PCT Pub. No.: WO2018/099551
PCT Pub. Date: Jun. 7, 2018

(65) Prior Publication Data
US 2020/0125720 A1 Apr. 23, 2020

(51) Int. Cl.
*G06F 21/52* (2013.01)
*G06F 21/57* (2013.01)
(Continued)

(52) U.S. Cl.
CPC .............. *G06F 21/52* (2013.01); *G06F 21/57* (2013.01); *H04L 9/0637* (2013.01); *H04L 9/3213* (2013.01); *H04L 2209/38* (2013.01)

(58) Field of Classification Search
CPC ....... G06F 21/52; G06F 21/57; H04L 9/0637; H04L 9/3213; H04L 2209/38
See application file for complete search history.

(56) References Cited

U.S. PATENT DOCUMENTS

| 8,826,033 B1 | 9/2014 | Krishnaprasad et al. |
| 10,659,434 B1 * | 5/2020 | Kim ..................... H04L 63/0236 |

(Continued)

FOREIGN PATENT DOCUMENTS

WO 2016090095 A1 6/2016

OTHER PUBLICATIONS

Unknown, Author, "AWS Management Portal for vCenter User Guide", https://web.archive.org/web/20150906113145/http://docs.aws.amazon.com/amp/latest/userguide/amp-ug.pdf, Sep. 6, 2015, pp. 1-57.

(Continued)

*Primary Examiner* — Abu S Sholeman
(74) *Attorney, Agent, or Firm* — Murphy, Bilak & Homiller, PLLC (57) ABSTRACT

A method (10) performed in an initiating runtime (2a) is disclosed for migrating an actor instance (5a1) of an actor (4a) to a target runtime (2b). The method (10) comprises obtaining (11), from a blockchain entity (3), an ownership token associated with the actor instance (5a1) of the actor (4a), the ownership token being verifiable by a blockchain (7) of the blockchain entity (3), and using (12) the ownership token for migrating the actor instance (5a1). A method in a blockchain entity (3), a method in a target runtime (2b), entities, computer programs and computer program products are also disclosed.

26 Claims, 5 Drawing Sheets

(51) Int. Cl.
    *H04L 9/06*           (2006.01)
    *H04L 9/32*           (2006.01)

(56) References Cited

U.S. PATENT DOCUMENTS

| | | | |
|---|---|---|---|
| 10,891,129 B1* | 1/2021 | Antonio | G06F 40/20 |
| 2008/0046960 A1 | 2/2008 | Bade et al. | |
| 2008/0271130 A1* | 10/2008 | Ramamoorthy | G06F 16/1824 726/9 |
| 2011/0099548 A1* | 4/2011 | Shen | G06F 9/45558 718/1 |
| 2016/0292680 A1* | 10/2016 | Wilson, Jr. | G06Q 20/40 |
| 2017/0024818 A1* | 1/2017 | Wager | G06Q 40/04 |

OTHER PUBLICATIONS

Zyskind, Guy, et al., "Decentralizing Privacy: Using Blockchain to Protect Personal Data", IEEE CS Security and Privacy Workshops, 2015, pp. 180-184.

Author Unknown, "Bitcoin—Open source P2P money", https://bitcoin.org/en, accessed Feb. 24, 2021, 1-4.

Author Unknown, "EricssonResearch / calvin-base", GitHub—EricssonResearch/calvin-base at Release-0.4.0, https://github.com/EricssonResearch/calvin-base/tree/Release-0.4.0, accessed Feb. 24, 2021, 1-7.

* cited by examiner

METHOD FOR MIGRATING AN ACTOR INSTANCE

TECHNICAL FIELD

The technology disclosed herein relates generally to the field of security in computing environments such as cloud computing, and in particular to methods and entities for migrating an actor instance of an actor of an application to a target runtime, computer programs and computer program products.

BACKGROUND

Application modules, also denoted actors, are parts of a distributed application and communicate with messages. The actors are executed in execution environments known as runtimes, which perform the executions described in the actors. Runtimes have attributes that describe the runtime functionality and other relevant information. Similarly, attributes are further associated with an instance of the actor. These attributes may comprise information about the user that started the application, such as username and password (s). An actor instance may be migrated to another runtime during execution, and in such a scenario, the state and attributes of the actor instance in an initiating runtime is sent to a target runtime, which instantiates a new instance of the actor (based on state and attributes) on that particular target runtime. When the migration of the actor instance from the initiating runtime to the target runtime has been completed, the actor instance in the initiating runtime may be deleted.

In order to restrict access to resources provided by the runtimes, such as e.g. cameras, temperature sensors or microphones, it is necessary for the runtime to compare the attributes associated with the actor instances towards an access control policy. The access control policy may list a number of conditions on user attributes as well as environmental attributes, such as time of day, for allowing access to a particular resource. Typically, attributes about the user under which the actor is running is established by some form of authentication procedure during application initialization, e.g. by supplying a username password, or using asymmetric keys.

Cloning, i.e. making a copy of an actor instance, needs to be prevented, in particular for distributed applications. In order to illustrate this, an example is given in the following wherein user Alice can unlock different doors by using an actor of an application, e.g. by performing an action in an application on her mobile device (e.g. pressing a button in the application). Triggered by the action, the actor of the application instructs the runtime to take an image, the image is sent to a face recognition actor and is used to authenticate Alice and if successfully authenticated the door lock opens. The application can be used to open doors at Alice's apartment, owned by malicious Eve, as well as at Alice's work place, administered by Bob. Bob and Eve use different identity providers, i.e., different face recognition schemes and databases are used during the authentication for the apartment and the work place. The application of this example comprises four actors:

Mobile device actor—displays a user interface (UI) where the user can perform an action (e.g. push a button) to unlock/lock door. When the action is performed, the mobile device actor takes an image using the camera of the mobile device and sends the image to a face recognition actor.

Face recognition actor—takes an image as input and sends an identity as output.

Authorization actor—takes the decision on whether a door can be locked/unlocked based on information about an identity and decision policy.

Door lock actor—locks/unlocks the door based on the input from the authorization actor.

The mobile device actor always remains in the runtime of the user's mobile device, but when the owner travels to work, the face recognition actor, the authorization actor, and the door actor all migrate to new runtimes associated with the work place. Bob and Eve do not necessarily have a trust relationship, except that both allow the usage of the same door-locking/unlocking application, and that both trust Alice to use the application for locking/unlocking their respective doors. If cloning of an actor is not prevented, Eve may clone the door lock actor instance of Alice, and start her own application with the cloned actor. By using her own face recognition actor and authorization actor, she can send an "unlock door command" to the cloned door unlock actor that she migrates to a runtime at Alice's work place, and can hence unlock the doors at Alice's work place. Cloning prevention is hence an absolute necessity to allow use cases such as the one described, in order for it to be performed securely.

The dynamic model of allowing an actor instance to migrate from an initiating runtime onto a target runtime makes it difficult to securely maintain the association of an actor instance and the subject attributes initially associated by the authentication procedure. One can imagine grouping a set of runtimes that are trusted into trusted domains where all runtimes are equally trusted. In such a domain, attributes may be maintained during a migration. However, it is desirable to not restrict usability to only trusted domains, and migration to a runtime in another domain should therefore also be supported. In a scenario where a runtime is under the control of a malicious user, the full state of the actor can be accessed, copied, manipulated and replayed as a part of any other application. Cloning of actors is an important issue, and it is difficult to establish whether an actor, seemingly being a part of the original application, truly is the original actor. As a result, it may, for security reasons, not be possible to grant the actor the same privileges to access runtime resources when migrating back, as when previously executing on that runtime.

From the above it is clear that there is a need for increased security in actor migration between different execution environments, i.e. between different runtimes.

SUMMARY

An objective of the present disclosure is to address and improve various security aspects in view of using different runtimes. A particular objective is to enable secure migration of actor instances of an actor of an application between different runtime resources. This objective and others are achieved by the methods, devices, computer programs and computer program products according to the appended independent claims, and by the embodiments according to the dependent claims.

The objective is according to an aspect achieved by a method performed in an initiating runtime for migrating an actor instance of an actor of an application to a target runtime. The method comprises obtaining, from a blockchain entity, an ownership token associated with the actor instance of the actor, the ownership token being verifiable by a blockchain of the blockchain entity, and using the ownership token for migrating the actor instance.

The method provides a number of advantages. For instance, runtimes (execution environments) can ensure that actor instances are not cloned instances of another actor, i.e., they are executing as in the context of the original application and not another application masqueraded to look like another application. This allows an actor migrating back to the previous runtime to regain the same privileges as it initially had. The provided anti-cloning system does not require any one particular runtime to be available in order to function.

The objective is according to an aspect achieved by a computer program for an initiating runtime for migrating an actor instance to a target runtime. The computer program comprises computer program code, which, when run by processing circuitry on the initiating runtime causes the initiating runtime to perform the method as above.

The objective is according to an aspect achieved by a computer program product comprising a computer program as above and a computer readable means on which the computer program is stored.

The objective is according to an aspect achieved by an initiating runtime for migrating an actor instance of an actor of an application to a target runtime. The initiating runtime is configured to obtain, from a blockchain entity, an ownership token associated with the actor instance of the actor, the ownership token being verifiable by a blockchain of the blockchain entity, and use the ownership token for migrating the actor instance securely.

The objective is according to an aspect achieved by a method in a blockchain entity for verifying a migration of an actor instance of an actor of an application from an initiating runtime to a target runtime. The method comprises providing, to an initiating runtime, an ownership token associated with the actor instance of the actor, the ownership token being verifiable by a blockchain of the blockchain entity, and verifying, upon request from the initiating runtime, a registration of a transfer of the ownership token.

The objective is according to an aspect achieved by a computer program for a blockchain entity for verifying migration of an actor instance from an initiating runtime to a target runtime. The computer program comprises computer program code, which, when run by processing circuitry on the blockchain entity causes the blockchain entity to perform the method as above.

The objective is according to an aspect achieved by a computer program product comprising a computer program as above and a computer readable means on which the computer program is stored.

The objective is according to an aspect achieved by a blockchain entity for verifying a migration of an actor instance of an actor of an application from an initiating runtime to a target runtime. The blockchain entity is configured to provide, to an initiating runtime, an ownership token associated with the actor instance of the actor, the ownership token being verifiable by a blockchain of the blockchain entity, and verify, upon request from the initiating runtime, a registration of a transfer of the ownership token.

The objective is according to an aspect achieved by a method in a target runtime for migration of an actor instance of an actor of an application from an initiating runtime to the target runtime. The method comprises receiving, from the initiating runtime, an initiation request for initiating a migration of the actor instance, the initiation request identifying the actor instance of the actor of the application, and verifying, with a blockchain entity, that a transfer request for transferring an ownership token is registered in the blockchain entity, the ownership token being associated with the actor instance of the actor of the application.

The objective is according to an aspect achieved by a computer program for a target runtime for migration of an actor instance of an application from an initiating runtime a target runtime. The computer program comprises computer program code, which, when run by processing circuitry on the target runtime causes the target runtime to perform the method as above.

The objective is according to an aspect achieved by a computer program product comprising a computer program as above and a computer readable means on which the computer program is stored.

The objective is according to an aspect achieved by a target runtime for migration of an actor instance of an actor of an application from an initiating runtime to the target runtime. The target runtime is configured to receive, from the initiating runtime, an initiation request for initiating a migration of the actor instance, the initiation request identifying the actor instance of the actor of the application, and verify, with a blockchain entity, that a transfer request for transferring an ownership token is registered in the blockchain entity, the ownership token being associated with the actor instance of the actor of the application.

Further features and advantages of the present disclosure will become clear upon reading the following description and the accompanying drawings.

DETAILED DESCRIPTION

In the following description, for purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

In order to provide thorough understanding of the present teachings and the various embodiments and features described herein, blockchains are described in the following.

A blockchain can be viewed as a ledger or distributed database that maintains a continuously growing list of data records describing all transactions that have occurred, or at least that have been incorporated into a main branch of transactions, e.g. as in Bitcoin. The main objective is to prevent the database from being tampered with and revised even if many (but not a majority) operators would collude. The initial and most widely known application of blockchain technology is the public ledger of transactions for Bitcoin. Another public blockchain is Ethereum, and there are also closed group (or permissioned) blockchains like Hyperledger. Permission blockchains can operate much faster than open blockchains that span multiple contents.

The blockchain is built from a chain of hash values, also denoted hashes, i.e. the outputs returned by a hash function, wherein each block contains a hash of the previous, i.e. preceding, block. This has the effect of creating a chain of blocks from the very first block (the genesis) to the current block to be incorporated. The chronological order of blocks is guaranteed because the previous block's hash would otherwise not be known. The idea is that it should be computationally infeasible to modify a block once it has been incorporated into the ledger, to do so means regenerating every block after the effected block. No single authority should have sufficient computing power to perform such a computation faster than the blockchain infrastructure; being able to do so means being able to, for the Bitcoin example, do double spending of coins.

When two blocks are created very close in time, forks of the blockchain occur. At some point, the branches are compared, and whichever branch that is the longest is chosen to be the main branch. All blocks that are part of the shorter branch are re-added to the queue of transactions for the main branch and will eventually be included in another block.

Continuing with the example of Bitcoin, the identities of the actual coins are not really tracked, instead the transactions, the unspent coins, or the sum of the wallets are tracked. In more powerful blockchains like Ethereum and Hyperledger one issues not only the data transaction commands (called scripts) but also programs called chain code. This allows for more flexibility in realizing transactions and one therefore speaks about smart-contracts where smart-smart contracts can be viewed as programs that define the behavior of given type of (business) transaction. Hence blockchain support today means to define all kinds of transactions and not only that of cyber currency or coins.

Briefly, the present teachings provide, in different embodiments, methods in an initiating runtime and in a target runtime that allows application modules instances, herein also referred to as actor instances, to be deployed in a distributed manner over several devices (with respective runtimes). Every legitimate running actor instance can be uniquely identified via a blockchain, allowing a runtime to verify that the actor instance is not a cloned version of the actor.

Figure 1:
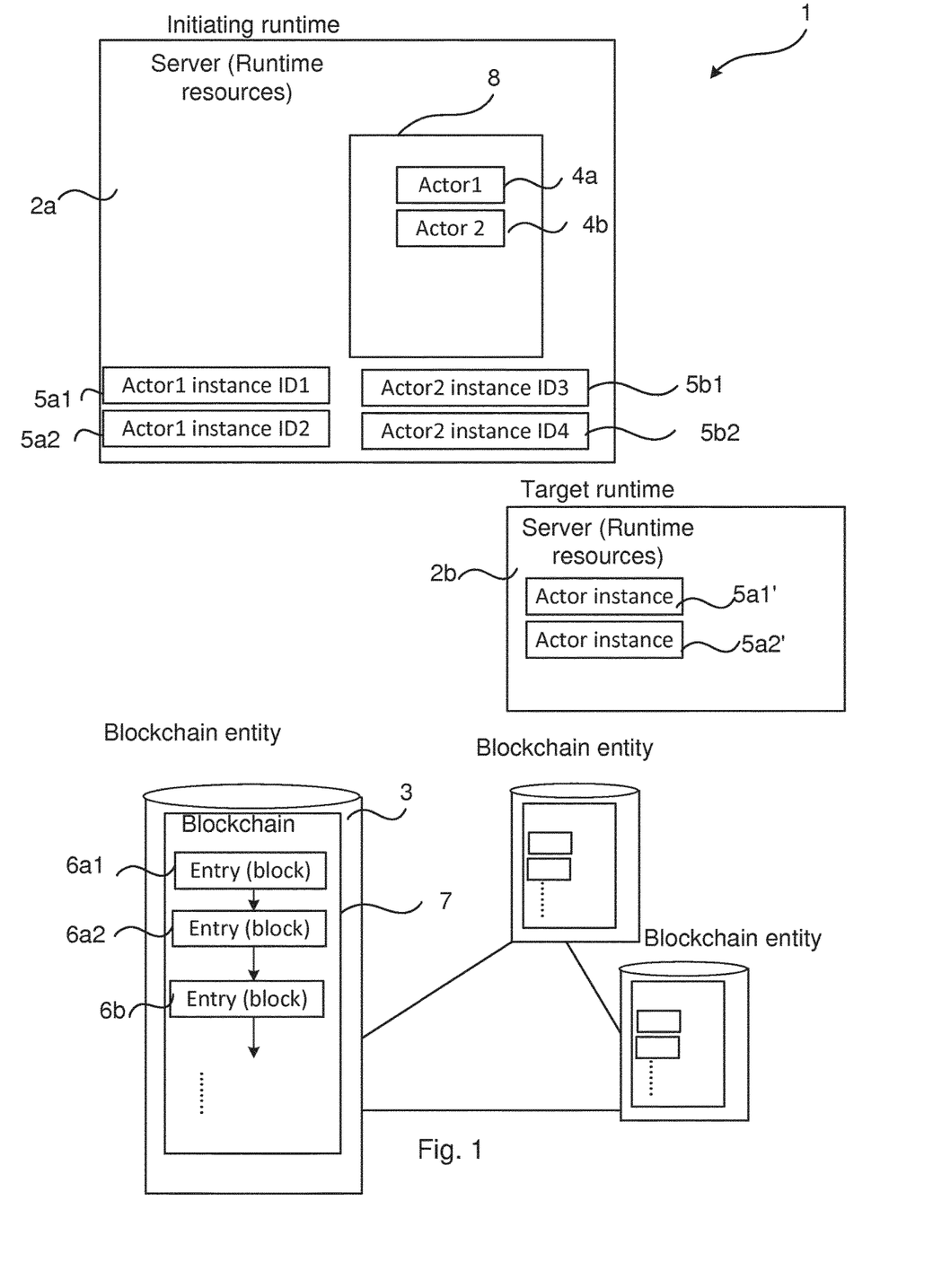
FIG. 1 illustrates schematically an environment in which embodiments according to the present teachings may be implemented.

FIG. 1 illustrates schematically an environment in which embodiments according to the present teachings may be implemented. The figure illustrates a system 1 for enabling secure migration of actor instances 5a1, 5a2 of actors 4a, 4b (also indicated as Actor1 and Actor2 in the figure) between an initiating runtime 2a and a target runtime 2b. The runtimes 2a, 2b may be run on different runtime resources, e.g. be run on different servers or as different virtual machines in same or different servers and/or different domains.

An application 8 may comprise several actors, e.g. a first actor 4a and a second actor 4b, each actor 4a, 4b performing a specific function (as exemplified in the background section). An actor instance 5a1, 5a2, 5b1, 5b2 is the concrete occurrence of the actors 4a, 4b. In some more detail, the actor 4a, 4b is the code to be executed, and when the actor 4a, 4b starts executing, it also gets a state describing where in the running program it currently is. The state also contains other relevant information such as, for instance, initiator of the application (user information), an activation record of connections with other actors and/or user interface hardware, etc. The code together with the state information is herein referred to as actor instance. Hence, if two applications are started using the same temperature actor, e.g. the first actor 4a, two instances of that actor are obtained; they contain the same actor code, but have different states, so the actor instances 5a1, 5a2 are also different. As has been described, an actor instance 5a1, 5a2 may be migrated from the initiating runtime 2a to a target runtime 2b, and such migrated actors are indicated in FIG. 1 at reference numeral 5a1', 5a2'.

The system 1 may also comprise a blockchain entity 3. It is noted that the blockchain entity 3 does not need to be, and is typically not, a single entity (such as a server), but a number of blockchain entities (as indicated in FIG. 1). The blockchain entity 3 is thus a collection of at least one, but typically more than one, maintainers of the blockchain 7 whose objective is to extend stepwise the blockchain using a consensus of what is to be included in the blockchain 7. The blockchain entity 3 grows a blockchain 7. Each of these entities can be seen as having a copy of the blockchain 7 and a blockchain protocol ensures that the extension of the blockchain 7 is made in a coordinated way and have the (majority) of the entities agreeing in the extension steps. In a strict sense the blockchain 7 is not inside the blockchain entity 3. The blockchain 7 may be read by anybody having access to a storage of the blockchain data (at a given time the data may be printed in a newspaper).

Methods are provided in which a blockchain framework, comprising at least one blockchain entity 3, is utilized to ensure that an actor instance 5a1, 5a2, 5b1, 5b2 associated with an actor 4a, 4b of an application 8 cannot be cloned (or be double-spent as would be a correspondence in Bitcoin to cloning).

An initiating runtime 2a starts an application containing a number of actors 4a, 4b. When (or before) the actors 4a, 4b are instantiated, the initiating runtime 2a may request an entry 6a1, 6a2, 6b in a blockchain 7 for each actor instances 5a1, 5a2 in the application 8. It is noted that the entries 6a1, 6a2, 6b are shown in a highly schematic way, and that the entries may, but need not, end up in the same block. In particular, a block in the blockchain may cover a large number of transactions; in Bitcoin for instance, there are (as of November 2016) in average 1500 transactions per block. A unique identity is assigned to each actor instance 5a1, 5a2, 5b1, 5b2 by the initiating runtime 2a. In FIG. 1 a first actor instance 5a1 of the first actor 4a is indicated by ID1, and a second actor instance 5a2 is indicated by ID2. Correspondingly, actor instances 5b1, 5b2 of the second actor 4b are also given a unique identity Id3, ID4. In the following the first actor 4a and its actor instances 5a1, 5a2 are used to exemplify the methods according to the present teachings.

The identities ID1, ID2 of actor instances 5a1, 5a2 of the first actor 5a may be sent to the blokhain entity 3 in a respective entry creation request and the identities are associated with the respective entry 6a1, 6a2 in a verifiable manner by the blockchain 7.

When the application 8 is started and the first actor 4a is instantiated for the first time, each actor instance 5a1, 5a2 is associated with a unique blockchain entry 6a1, 6a2 (one blockchain entry per actor instance 5a1, 5a2), e.g. using the above described entry creation requests. When a migration of an actor instance 5a1, 5a2 is to be negotiated, a transaction block is added to a blockchain queue. When the transaction block is incorporated into a main chain of the blockchain 7 of a blockchain entity 3, the migration can fully proceed. It is noted that, as opposed to Bitcoin, it is important for the blockchain 7 to track the state or identity of the actor instance 5a1, 5a2 that is being migrated, i.e., a runtime needs to be able to reliably determine the actor instances 5a1, 5a2, 5b1, 5b2 not only the number of actors 4a, 4b. In a blockchain system like Ethereum this can be achieved by including the identity as a part of the program executing in the blockchain. It is further noted that the transaction can be made quickly, just as in Bitcoin. A time consuming part may be the verification/endorsement of the transaction block in the blockchain 7. Hence, depending on the trust relation between the target runtime 2b and the initiating runtime 2a, the target runtime 2b may uphold a strict policy requiring that the transaction is registered in the blockchain 7 before allowing the migrated actor 5a1', 5a2' to run. In other embodiments, the target runtime 2b may give the migrated actor instance 5a1', 5a2' a status of being allowed to start operation with limited capabilities until the registration has been observed, after which full capabilities may be allowed.

In order to exemplify the above, an example in a Calvin application environment is given next. In this example, the application 8 comprises a temperature actor 4a, temp_actor, and a display actor 4b, disp_actor. The application 8 connects the temp_actor 4a and the disp_actor 4b so that a temperature measurement is sent and shown on a display. Two people (Alice and Bob) start the same application on the same initiating runtime 2a. This results in the following actor instances on that initiating runtime 2a:
temp_actor_instance_Alice (5a1),
temp_actor_instance_Bob (5a2),
disp_actor_instance_Alice (5b1),
disp_actor_instance_Bob (5b2).

The code in the actor instances 5a1, 5a2 is the same in the temp_actor_instance_Alice 5a1 and the temp_actor_instance_Bob 5a2, respectively disp_actor_instance_Alice 5b1 and disp_actor_instance_Bob 5b2, but the states are all different.

For each of these actor instances, the initiating runtime 2a will request an ownership token from the blockchain entity 3. This may be performed for each actor instance already before they are instantiated for the first time, or independently for just one actor instance when that particular actor instance is to be migrated. After this, the actor instances can be independently migrated, e.g. Bob might migrate the actor instance temp_actor_instance_Bob 5a2 to another runtime in order to measure the temperature in another place, while the other actor instances remain on the first runtime. The procedure described herein on how to migrate an actor instance is applied for temp_actor_instance_Bob 5a2, but not for the other actor instances 5a1, 5b1, 5b2.

In one embodiment, the initiating runtime makes a transaction request to the blockchain 7, i.e., a request to migrate the actor to the target runtime. When a receipt is returned of a successful transaction, the initiating runtime 2a proceeds with the migration to the target runtime 2b. The target runtime 2b may verify that the transaction has been accepted by the blockchain 7, either by itself or by requesting the blockchain entity 3 to do the verification. If the verification succeeds, the target runtime 2b can instantiate the actor again based on the state sent from the initiating runtime 2a.

If the application 8 is terminated, all actor instances 5a1, 5a2 of that application 8 may also be terminated. In one embodiment, the entries associated with the application 8 are revoked by the initiating runtime 2a sending actor entry revocation requests to the blockchain 7. In another embodiment, the entries are transferred back to entry repository, and reused by other actor instances that are instantiated later.

The target runtime 2b may, as noted earlier, have a policy that defines the behavior of the target runtime 2b when handling the migrated actor instance. There can be several alternatives such as, for instance:

The received actor instance is not allowed to start before a domain transfer has been recorded in the blockchain 7 with a prescribed figure of assurance, e.g. hash of the transfer appears in 6 consecutive blocks in the hash chain.

The received actor instance is allowed to start under limited regime, i.e. under certain conditions, e.g. strict limitation to resources in the target domain, and the restrictions are (partially) lifted when the target runtime 2b can verify the transfer in the blockchain 7.

In the following, various embodiments are described in connection with Bitcoin, but it is noted that other blockchain realizations can be used instead, e.g. Ethereum.

Figure 2:
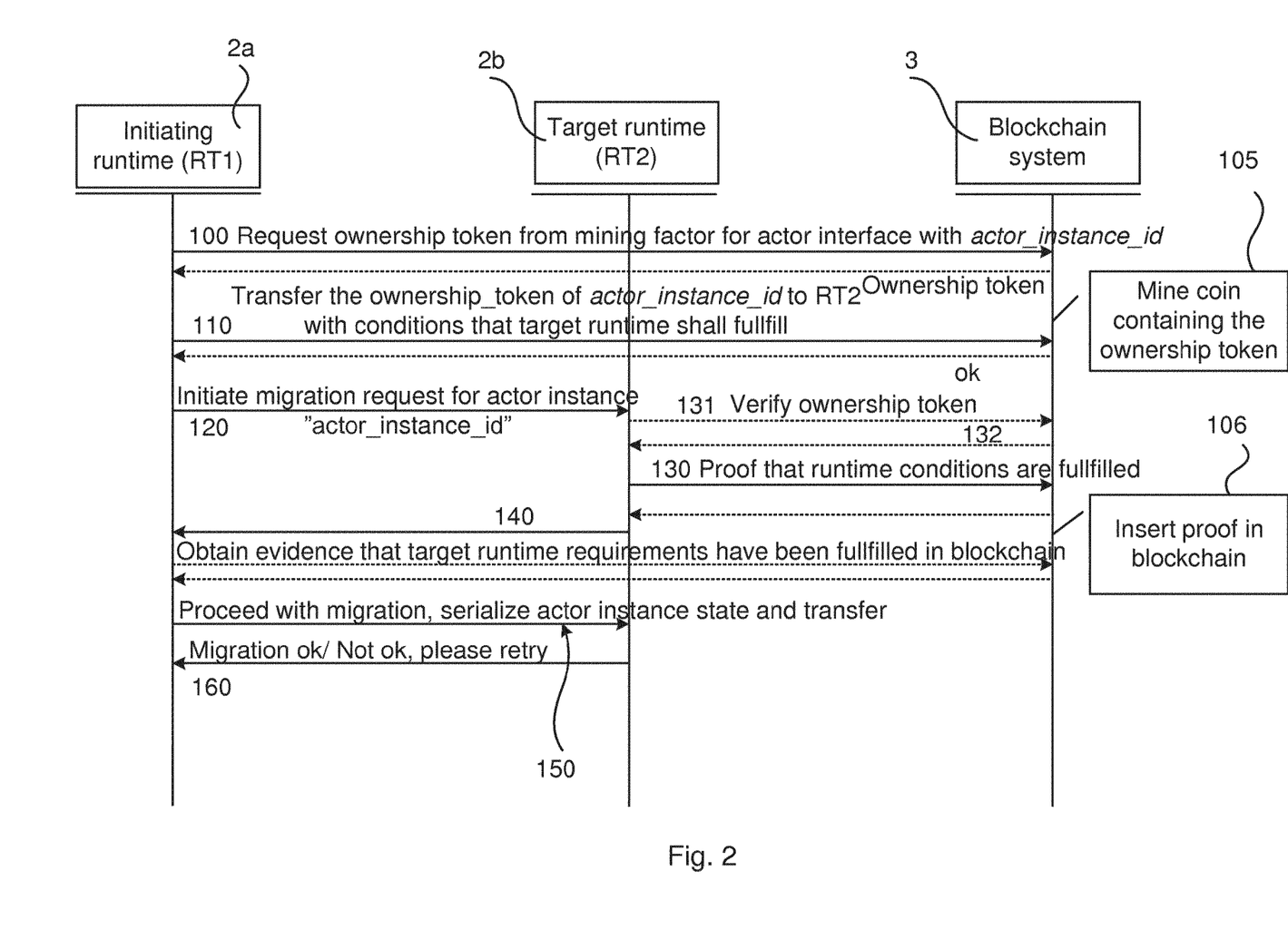
FIG. 2 is a sequence diagram illustrating aspects according to the present teachings.

FIG. 2 is a sequence diagram illustrating the above described aspects, and others, according to the present teachings. In the figure, dotted lines indicate that explicit messages are not necessarily sent, but rather indicate a verification of data in the blockchain 7.

At arrow 100, the initiating runtime 2a, wanting to migrate a first actor instance 5a1 sends a request to the blockchain entity 3. The request is used for requesting an ownership token from the blockchain entity 3 for the first actor instance 5a1 having identity actor_instance_id ID1. In response, the initiating runtime 2a obtains proof of ownership of the actor instance 5a1 from the blockchain entity 3. It is noted that this proof does need to be provided in an explicit message (this fact being indicated by the dotted line), but indicates a verification of data in the blockchain.

At box 105, the blockchain entity 3 receiving the request for the ownership token (that can be used as proof of ownership of the actor instance 5a1), verifies that the request comes from the claimed initiating runtime 2a and mines a coin comprising the ownership token.

At arrow 110, the initiating runtime 2a initiates a transfer of the actor instance 5a1 to the target runtime 2b by providing the proof of ownership of the actor instance 5a1 to the blockchain entity 3. The initiating runtime 2a may also provide conditions that the target runtime 2b needs to fulfill when registering the transfer in the blockchain entity 3. Such conditions may, for instance, comprise attests to the security state of the target runtime and/or availability of cryptographic hardware and features.

In response to a transfer registration request, the blockchain entity 3 will check ownership and if successfully verified the blockchain entity 3 stores the conditions as a transfer contract in the blockchain entity 3. If the ownership check fails, the blockchain entity 3 does not register the request.

At dotted arrows 131, 132, the target runtime 2b performs a transfer initiation with the blockchain entity 3, wherein the ownership token is verified.

At arrow 130, after the transfer initiation, the target runtime 2b consults the blockchain entity 3 to check if the transfer request is registered and to fetch instructions for possible runtime conditions that must be fulfilled.

If the latter is required, i.e. the initiating runtime 2a has provided some conditions that need to be fulfilled by the target runtime 2b, then the target runtime 2a provides the missing proofs in order to fulfil the transfer contract. The blockchain entity 3 will operate on the transfer contract in response to proofs sent by the target runtime 2b until all of them have been satisfied, in which case the event is registered in the blockchain entity 3.

At arrow 140, the initiating runtime 2a will wait with the migration until obtaining evidence from the blockchain entity 3 that the target runtime 2b is able to satisfy the conditions (if any) in the transfer contract. The dotted line below arrow 140 indicates (as noted earlier) that explicit messages are not necessarily sent, but rather indicates a verification of data in the blockchain 7.

At arrow 150, when the initiating runtime 2a obtains the evidence from the blockchain entity 3, it proceeds with the migration. In particular, the initiating runtime 2a serializes the actor instance 5a1 state and transfer the actor instance state to the target runtime 2b.

The various features and embodiments that have been described may be combined in many different ways, examples of which are given in the following, with reference first to FIG. 3.

Figure 3A:
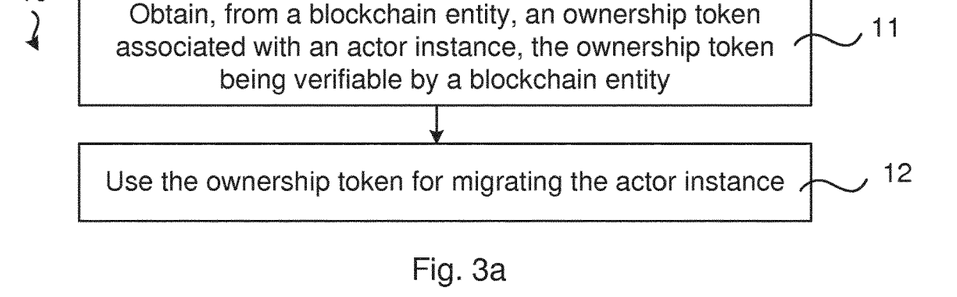
FIG. 3 illustrates a flow chart of steps of a method in an initiating runtime resource in accordance with the present teachings.

FIG. 3a illustrates a flow chart of steps of a method in an initiating runtime resource in accordance with the present teachings. The method 10 may be performed in an initiating runtime 2a for migrating an actor instance 5a1 of an actor 4a of an application 8 to a target runtime 2b. It is noted that the application 8 may comprise a single actor, and the application 8 may, for instance, be a virtual machine that may be migrated between different runtime resources.

The method 10 comprises obtaining 11, from a blockchain entity 3, an ownership token associated with the actor instance 5a1 of the actor 4a, the ownership token being verifiable by a blockchain 7 of the blockchain entity 3.

The method 10 comprises using 12 the ownership token for migrating the actor instance 5a1.

The method 10 brings about several advantages. For instance, the method 10 can be used for migrating an actor instance in a secure way, the use of the ownership token ensuring that the actor instance is not a cloned version. The method allows a running actor instance on an initiating runtime to be migrated to a target runtime, wherein the target runtime is enabled to verify that the actor instance is unique before allowing the migration to finalize.

Figure 3B:
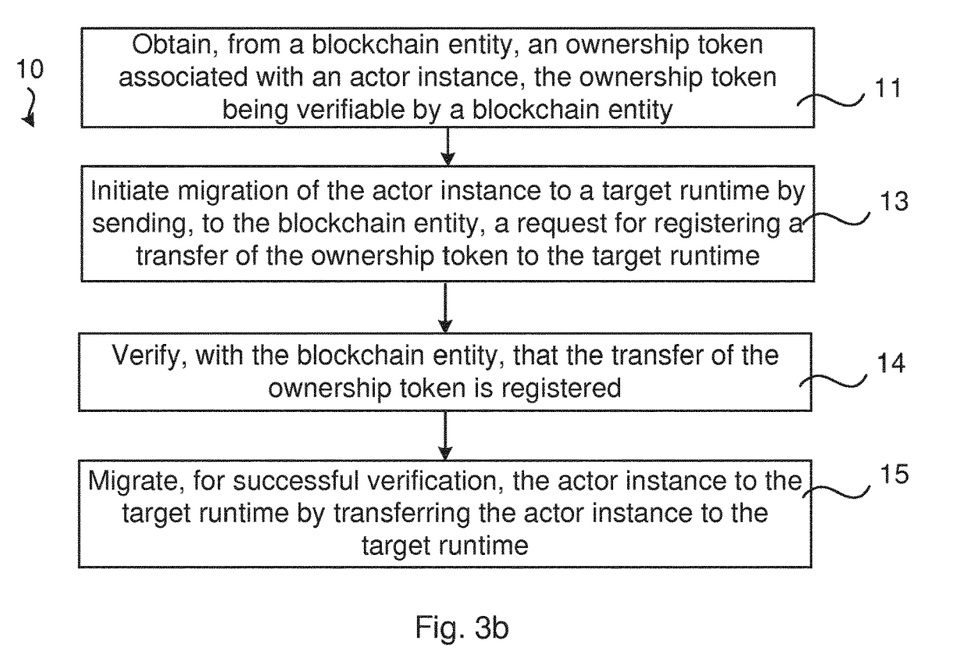

In some embodiments, illustrated in a flow chart of FIG. 3b, the using 12 of the ownership token comprises:
  initiating 13 the migration of the actor instance 5a1 to the target runtime 2b by sending, to the blockchain entity 3, a request for registering a transfer of the ownership token to the target runtime 2b,
  verifying 14, with the blockchain entity 3, that the transfer of the ownership token is registered, and
  migrating 15, upon successful verification, the actor instance 5a1 to the target runtime 2b by transferring the actor instance 5a1 to the target runtime 2b. Upon a failed verification, the initiating 13 and verifying 14 may be repeated.

The ownership token proves ownership of the actor instance 5a1. The initiating runtime 2a have requested an entry 6a, 6b in the blockchain 7 for each actor instance 5a1, 5a2 for each actor 4a, 4b of an application 8. There is thus a first entry 6a in the blockchain 7 for actor instance 5a1 of a first actor 2a which is to be migrated. As has been described herein, each actor 4a, 4b may have several actor instances 5a1, 5a2. The request for the entry 6a, 6b also comprises a unique identification of each actor instance 5a1, 5a2 of the actor 4a. In response to the request, the blockchain entity 3 thereby creates a unique blockchain entry for each actor instance 5a1, 5a2 of each actor 4a, 4b of the application 8. The application 8 may comprise one or more actors 4a, 4b, and there may be one or more actor instances 5a1, 5a2 of each actor 4a, 4b.

In variations of the above embodiments, the verifying 14 comprises:
  providing, to the blockchain entity 3, one or more conditions that the target runtime 2b has to fulfil for registering the transfer, and
  verifying with the blockchain entity 3 that the target runtime 2b fulfils each of the one or more conditions.

The verifying 14 may, for instance, further comprise obtaining evidence from the blockchain entity 3 proving that the target runtime 2b fulfils the at least one condition. Examples on such condition comprise various security requirements on the target runtime 2b and conditions relating to the handling of the actor instance.

In various embodiments, the verifying comprising obtaining, from the blockchain entity 3, evidence proving that the target runtime 2b fulfils each of the one or more conditions.

In various embodiments, the one or more conditions comprises one or more of: fulfillment of a security requirement and fulfillment of conditions relating to the handling of the actor instance.

In various embodiments, the method 10 comprises, prior to the obtaining 11, sending one or more requests to the blockchain entity 3 requesting an entry 6a, 6b in the blockchain 7 for each of the actor instances 5a1, 5a2, each of the one or more requests comprising a unique identification for a respective actor instance 5a1, 5a2 of the actor 4a.

In various embodiments, the method 10 comprises, upon terminating an application 8 comprising the actor 4a, sending one or more requests to the blockchain entity 3 for revoking each entry associated with a respective actor instance 5a1, 5a2 of the application 8.

Figure 4:
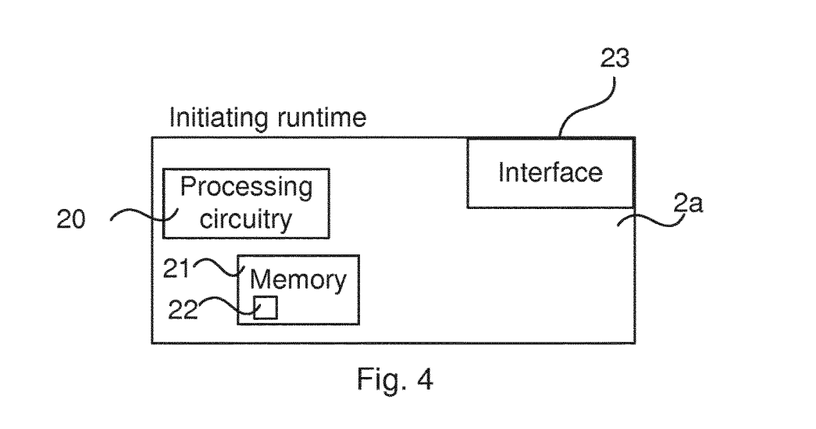
FIG. 4 illustrates schematically an initiating runtime resource and means for implementing methods of the present teachings.

FIG. 4 illustrates schematically an initiating runtime (or initiating runtime resource) and means for implementing methods of the present teachings. The initiating runtime 2a may comprise a virtual machine running on a server or other hardware, or the initiating runtime 2a may comprise hardware, software or combinations thereof.

The initiating runtime 2a comprises processing circuitry 20, which may be any combination of one or more of a suitable central processing unit (CPU), multiprocessor, microcontroller, digital signal processor (DSP), etc., capable of executing software instructions stored in a computer program product 21, e.g. in the form of a storage medium 21. The processing circuitry 20 may further be provided as at least one application specific integrated circuit (ASIC), or field programmable gate array (FPGA).

The processing circuitry 20 is configured to cause the initiating runtime 2a to perform a set of operations, or steps, e.g. as described in relation to FIGS. 3a and 3b. For example, the storage medium 21 may store the set of operations, and the processing circuitry 20 may be configured to retrieve the set of operations from the storage medium 21 to cause the initiating runtime 2a to perform the set of operations. The set of operations may be provided as a set of executable instructions. The processing circuitry 20 is thereby arranged to execute methods as disclosed herein.

The storage medium 21 may also comprise persistent storage, which, for example, can be any single one or combination of magnetic memory, optical memory, solid state memory or even remotely mounted memory.

The initiating runtime 2a may further comprise an interface 23 for communications with e.g. a target runtime 2b and a blockchain entity 3. The communications interface 23 may comprise one or more input/output devices or a protocol stack for communication with other devices or entities. The interface 23 may be used for receiving data input and for outputting data.

An initiating runtime 2a is provided for migrating an actor instance 5a1 of an actor 4a of an application 8 to a target runtime 2b. The initiating runtime 2a is configured to:
  obtain, from a blockchain entity 3, an ownership token associated with the actor instance 5a1 of the actor 4a, the ownership token being verifiable by a blockchain 7 of the blockchain entity 3, and
  use the ownership token for migrating the actor instance 5a1.

The initiating runtime 2a may be configured to perform the above steps e.g. by comprising one or more processors 20 (or processing circuitry) and memory 21, the memory 21 containing instructions executable by the processor 20, whereby the initiating runtime 2a is operative to perform the steps. That is, in an embodiment, a initiating runtime 2a is provided for migrating an actor instance 5a1. The initiating runtime 2a comprises one or more processors 20 and memory 21, the memory 21 containing instructions executable by the processor 20, whereby the initiating runtime 2a is operative to: obtain, from a blockchain entity, an ownership token associated with the actor instance of the actor, the ownership token being verifiable by a blockchain of the blockchain entity, and use the ownership token for migrating the actor instance.

In some embodiments, the initiating runtime 2a is configured to use by:
  initiating the migration of the actor instance 5a1 to the target runtime 2b by sending, to the blockchain entity 3, a request for registering a transfer of the ownership token to the target runtime 2b,
  verifying, with the blockchain entity 3, that the transfer of the ownership token is registered, and
  migrating, upon successful verification, the actor instance 5a1 to the target runtime 2b by transferring the actor instance 5a1 to the target runtime 2b.

In some embodiments, the initiating runtime 2a is configured to verify by:
  providing to the blockchain entity 7, one or more conditions that the target runtime 2b has to fulfil for registering the transfer, and
  verifying with the blockchain entity 3 that the target runtime 2b fulfils each of the one or more conditions.

In some embodiments, the initiating runtime 2a is configured to verify by obtaining, from the blockchain entity 3, evidence proving that the target runtime 2b fulfils each of the one or more conditions.

In various embodiments, the one or more conditions comprises one or more of: fulfillment of a security requirement and fulfillment of conditions on handling of the actor instance.

In various embodiments, the initiating runtime 2a is configured to, prior to the obtaining, send one or more requests to the blockchain entity 3 requesting an entry 6a, 6b in the blockchain 7 for each of the actor instances 5a1, 5a2, each of the one or more requests comprising a unique identification for a respective actor instance 5a1, 5a2 of the actor 4a.

In various embodiments, the initiating runtime 2a is configured to, upon terminating the application, send one or more requests to the blockchain entity 3 for revoking each entry associated with a respective actor instance 5a1, 5a2.

Figure 5:
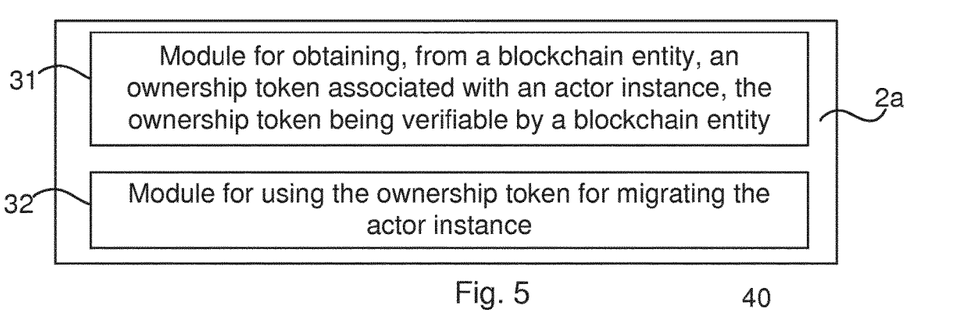
FIG. 5 illustrates an initiating runtime resource comprising function modules/software modules for implementing methods in accordance with the present teachings.

FIG. 5 illustrates an initiating runtime resource comprising function modules/software modules for implementing methods in accordance with the present teachings. The function modules can be implemented using software instructions such as computer program executing in a processor and/or using hardware, such as application specific integrated circuits (ASICs), field programmable gate arrays, discrete logical components etc., and any combination thereof. Processing circuitry may be provided, which may be adaptable and in particular adapted to perform any of the steps of the method 10 that has been described in various embodiments.

An initiating runtime 2a is provided for migrating an actor instance. The initiating runtime 2a comprises a first module 31 for obtaining, from a blockchain entity 3, an ownership token associated with the actor instance 5a1 of the actor 4a, the ownership token being verifiable by a blockchain 7 of the blockchain entity 3. Such first module 31 may, for instance, comprise processing circuitry adapted for receiving or adapted for requesting the ownership token, or processing circuitry adapted in still other ways for obtaining the ownership token.

The initiating runtime 2a comprises a second module 32 for using the ownership token for migrating the actor instance 5a1. Such second module 32 may, for instance, comprise processing circuitry adapted to use the ownership token e.g. by initiating the migration of the actor instance 5a1 to the target runtime 2b by sending, to the blockchain entity 3, a request for registering a transfer of the ownership token to the target runtime 2b, verifying, with the blockchain entity 3, that the transfer of the ownership token is registered, and migrating, for successful verification, the actor instance 5a1 to the target runtime 2b by transferring the actor instance 5a1 to the target runtime 2b.

It is noted that one or both of the modules 31, 32 may be replaced by units.

Figures 6, 7:
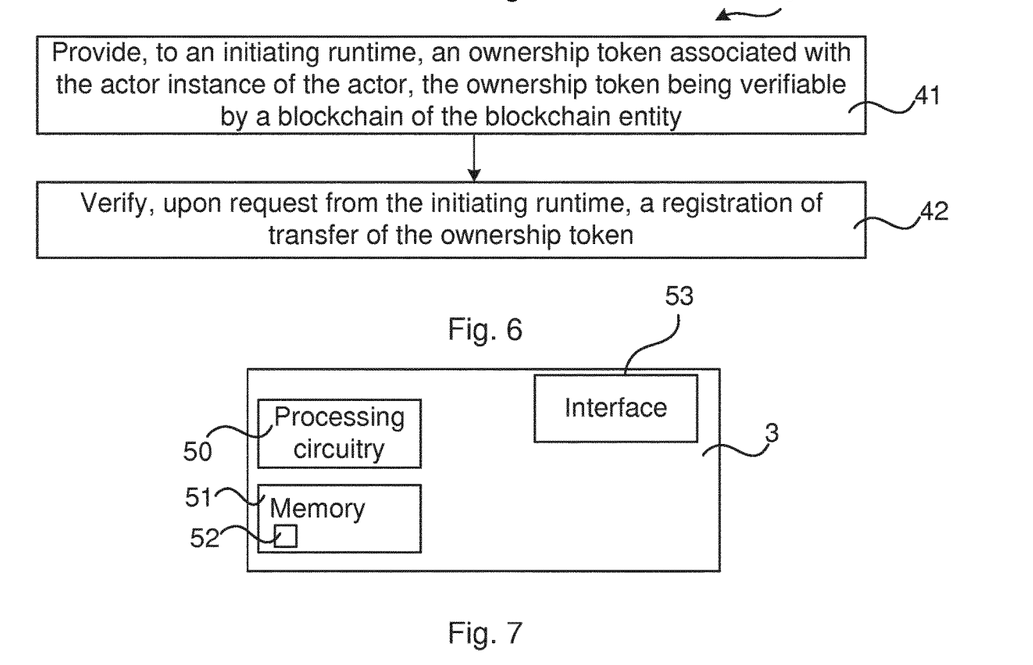
FIG. 6 illustrates a flow chart of steps of a method in blockchain entity in accordance with the present teachings.
FIG. 7 illustrates schematically a blockchain entity and means for implementing methods in accordance with the present teachings.

FIG. 6 illustrates a flow chart of steps of a method in blockchain entity in accordance with the present teachings. The method 40 may be performed in a blockchain entity 3 for verifying a migration of an actor instance 5a1 of an actor 4a of an application 8 from an initiating runtime 2a to a target runtime 2b. The method 40 comprises:
  providing 41, to an initiating runtime 2a, an ownership token associated with the actor instance 5a1 of the actor 4a, the ownership token being verifiable by a blockchain 7 of the blockchain entity 3, and
  verifying 42, upon request from the initiating runtime 2a, a registration of a transfer of the ownership token.

In an embodiment, the method 40 comprises, prior to the providing 41:
  receiving, from the initiating runtime 2a, one or more requests requesting an entry 6a in the blockchain 7 for each actor instance 5a1, 5a2, the one or more requests comprising a unique identification for a respective actor instance 5a1, 5a2 of the actor 4a, and creating a unique blockchain entry for each actor instance 5a1 based on the respective unique identification of the actor instance 5a1.

In various embodiments, the method 40 comprises receiving, from the initiating runtime 2a at least one condition to be fulfilled by a target runtime 2b for the transfer of the ownership token to be registered.

In various embodiments, the method 40 comprises registering in the blockchain 7 a change of ownership by incorporating in the blockchain 7 a transaction block for the transfer.

In various embodiments, the method 40 comprises:

receiving, from the initiating runtime 2a, a request for registering a transfer of the ownership token to the target runtime 2b, verifying the registration of the transfer of the ownership token upon successful check of the ownership.

In various embodiments, the verifying comprises verifying fulfillment of at least one condition that the target runtime 2b has to fulfil for the transfer of the ownership token to be registered.

FIG. 7 illustrates schematically a blockchain entity and means for implementing methods in accordance with the present teachings. The blockchain entity 3 may, as described in relation to FIG. 1, comprise a number of entities or maintainers of a blockchain 7 whose objective is to extend stepwise the blockchain using a consensus of what is to be included in the blockchain 7. For further details, reference is made to FIG. 1 and related description.

The blockchain entity 3 comprises processing circuitry 50, which may be any combination of one or more of a suitable central processing unit (CPU), multiprocessor, microcontroller, digital signal processor (DSP), etc., capable of executing software instructions stored in a computer program product 51, e.g. in the form of a storage medium 51. The processing circuitry 50 may further be provided as at least one application specific integrated circuit (ASIC), or field programmable gate array (FPGA).

The processing circuitry 50 is configured to cause the blockchain entity 3 to perform a set of operations, or steps, e.g. as described in relation to FIG. 6. For example, the storage medium 51 may store the set of operations, and the processing circuitry 50 may be configured to retrieve the set of operations from the storage medium 51 to cause the blockchain entity 3 to perform the set of operations. The set of operations may be provided as a set of executable instructions. The processing circuitry 50 is thereby arranged to execute methods as disclosed herein.

The storage medium 51 may also comprise persistent storage, which, for example, can be any single one or combination of magnetic memory, optical memory, solid state memory or even remotely mounted memory.

The blockchain entity 3 may further comprise an interface 53 for communications with, for instance an initiating runtime 2a and a target runtime 2b. The communications interface 53 may comprise one or more input/output devices or a protocol stack for communication with other devices or entities. The interface 53 may be used for receiving data input and for outputting data.

A blockchain entity 3 is provided for verifying a migration of an actor instance 5a1 of an actor 4a of an application 8 from an initiating runtime 2a to a target runtime 2b. The blockchain entity 3 is configured to:

provide, to an initiating runtime 2a, an ownership token associated with the actor instance 5a1 of the actor 4a, the ownership token being verifiable by a blockchain 7 of the blockchain entity 3, and verify, upon request from the initiating runtime 2a, a registration of a transfer of the ownership token.

The blockchain entity 3 may be configured to perform the above steps e.g. by comprising one or more processors 50 (or processing circuitry) and memory 51, the memory 51 containing instructions executable by the processor 50, whereby the blockchain entity 3 is operative to perform the steps. That is, in an embodiment, a blockchain entity 3 is provided for verifying a migration of an actor instance 5a1. The blockchain entity 3 comprises one or more processors 50 and memory 51, the memory 51 containing instructions executable by the processor 50, whereby the blockchain entity 3 is operative to: provide, to an initiating runtime, an ownership token associated with the actor instance of the actor, the ownership token being verifiable by a blockchain of the blockchain entity, and verify, upon request from the initiating runtime, a registration of a transfer of the ownership token.

In various embodiments, the blockchain entity 3 is configured to, prior to the providing:

receive, from the initiating runtime 2a, one or more requests requesting an entry 6a in the blockchain 7 for each actor instance 5a1, 5a2, the one or more requests comprising a unique identification for a respective actor instance 5a1, 5a2 of the actor 4a, and create a unique blockchain entry for each actor instance 5a1 based on the respective unique identification of the actor instance 5a1.

In various embodiments, the blockchain entity 3 is configured to receive, from the initiating runtime 2a at least one condition to be fulfilled by a target runtime 2b for the transfer of the ownership token to be registered.

In various embodiments, the blockchain entity 3 is configured to register in the blockchain 7 a change of ownership by incorporating in the blockchain 7 a transaction 30o block for the transfer.

In various embodiments, the blockchain entity 3 is configured to:

receive, from the initiating runtime 2a, a request for registering a transfer of the ownership token to the target runtime 2b, verify the registration of the transfer of the ownership token upon successful check of the ownership.

In variations of the above embodiment, the blockchain entity 3 is configured to verify fulfillment of at least one condition that the target runtime 2b has to fulfil for the transfer of the ownership token to be registered.

Figure 8:
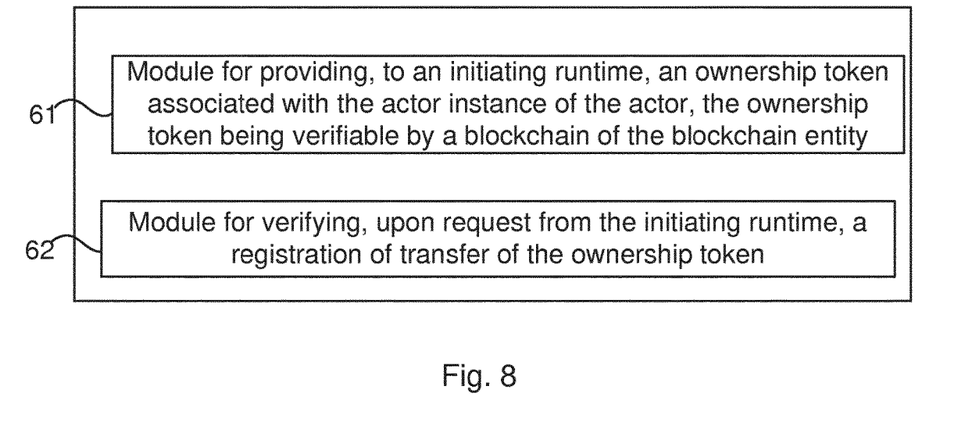
FIG. 8 illustrates a blockchain entity comprising function modules/software modules for implementing methods in accordance with the present teachings.

FIG. 8 illustrates a blockchain entity comprising function modules/software modules for implementing methods in accordance with the present teachings. The function modules can be implemented using software instructions such as computer program executing in a processor and/or using hardware, such as application specific integrated circuits (ASICs), field programmable gate arrays, discrete logical components etc., and any combination thereof. Processing circuitry may be provided, which may be adaptable and in particular adapted to perform any of the steps of the method 40 that has been described in various embodiments.

A blockchain entity 3 is provided for verifying a migration of an actor instance. The blockchain entity comprises a first module 61 for providing, to an initiating runtime, an ownership token associated with the actor instance of the actor, the ownership token being verifiable by a blockchain of the blockchain entity. Such first module 61 may, for instance, comprise processing circuitry adapted for sending or processing circuitry adapted in other ways for providing the ownership token associated with the actor instance of the actor to an initiating runtime.

The blockchain entity comprises a second module 62 for verifying, upon request from the initiating runtime, a registration of a transfer of the ownership token. Such second module 62 may, for instance, comprise processing circuitry adapted to perform such verification.

It is noted that one or both of the modules 61, 62 may be replaced by units.

Figure 9:
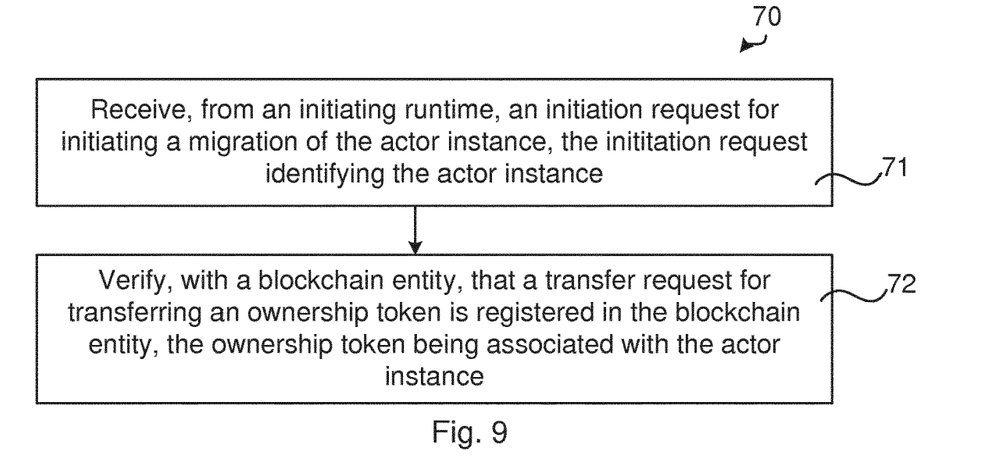
FIG. 9 illustrates a flow chart of steps of a method in a target runtime resource in accordance with the present teachings.

FIG. 9 illustrates a flow chart of steps of a method in a target runtime resource in accordance with the present teachings. The method 70 may be performed in a target runtime 2b for migration of an actor instance 5a1 of an actor 4a of an application 8 from an initiating runtime 2b to the target runtime 2b. The method 70 comprises receiving 71, from the initiating runtime 2a, an initiation request for initiating a migration of the actor instance 5a1, the initiation request identifying the actor instance 5a1 of the actor 4a. The method 70 comprises verifying 72, with a blockchain entity 3, that a transfer request for transferring an ownership token is registered in the blockchain entity 3, the ownership token being associated with the actor instance 5a1 of the actor 4a.

In an embodiment, the verifying 72 comprises:
sending, to the blockchain entity 3, a verification request for verifying the transfer request,
obtaining, from the blockchain entity 3, request for proof of fulfillment of one or more conditions for the transfer request to be registered, and
providing proof for fulfillment of the one or more conditions and receiving in response a verification from the blockchain entity 3.

In some embodiments, the method 70 comprises, upon successful verification, receiving the actor instance 5a1.

Figure 10:
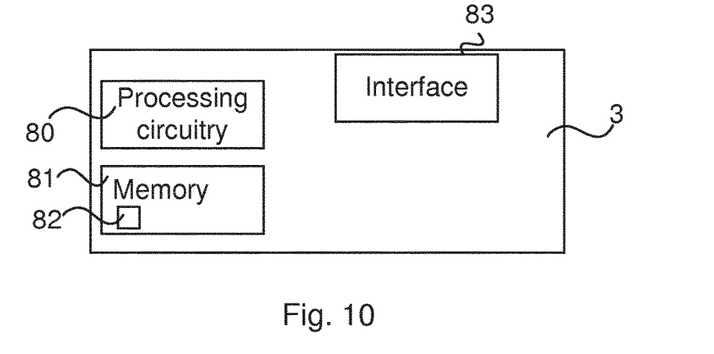
FIG. 10 illustrates schematically a target runtime resource and means for implementing methods in accordance with the present teachings.

FIG. 10 illustrates schematically a target runtime (or target runtime resource) and means for implementing methods in accordance with the present teachings. The target runtime 2b may comprise a virtual machine running on a server or other hardware, or the target runtime 2b may comprise hardware, software or combinations thereof.

The target runtime 2b comprises processing circuitry 80, which may be any combination of one or more of a suitable central processing unit (CPU), multiprocessor, microcontroller, digital signal processor (DSP), etc., capable of executing software instructions stored in a computer program product 81, e.g. in the form of a storage medium 81. The processing circuitry 80 may further be provided as at least one application specific integrated circuit (ASIC), or field programmable gate array (FPGA).

The processing circuitry 80 is configured to cause the target runtime 2b to perform a set of operations, or steps, e.g. as described in relation to FIG. 7. For example, the storage medium 81 may store the set of operations, and the processing circuitry 80 may be configured to retrieve the set of operations from the storage medium 81 to cause the target runtime 2b to perform the set of operations. The set of operations may be provided as a set of executable instructions. The processing circuitry 80 is thereby arranged to execute methods as disclosed herein.

The storage medium 81 may also comprise persistent storage, which, for example, can be any single one or combination of magnetic memory, optical memory, solid state memory or even remotely mounted memory.

The target runtime 2b may further comprise an interface 83 for communications with e.g. an initiating runtime 2a and a blockchain entity 3. The communications interface 83 may comprise one or more input/output devices or a protocol stack for communication with other devices or entities. The interface 83 may be used for receiving data input and for outputting data.

A target runtime 2b is provided for migration of an actor instance 5a1 of an actor 4a of an application 8 from an initiating runtime 2b to the target runtime 2b. The target runtime 2b is configured to:
receive, from the initiating runtime 2a, an initiation request for initiating a migration of the actor instance 5a1, the initiation request identifying the actor instance 5a1 of the actor 4a, and
verify, with a blockchain entity 3, that a transfer request for transferring an ownership token is registered in the blockchain entity 3, the ownership token being associated with the actor instance 5a1 of the actor 4a.

The target runtime 2b may be configured to perform the above steps e.g. by comprising one or more processors 80 (or processing circuitry) and memory 81, the memory 281 containing instructions executable by the processor 80, whereby the target runtime 2b is operative to perform the steps. That is, in an embodiment, a target runtime 2b is provided for migrating an actor instance 5a1. The target runtime 2b comprises one or more processors 80 and memory 81, the memory 81 containing instructions executable by the processor 80, whereby the target runtime 2b is operative to: receive, from the initiating runtime, an initiation request for initiating a migration of the actor instance, the initiation request identifying the actor instance of the actor of the application, and verify, with a blockchain entity, that a transfer request for transferring an ownership token is registered in the blockchain entity, the ownership token being associated with the actor instance of the actor.

In an embodiment, the target runtime 2b is configured to verify by:
sending, to the blockchain entity 3, a verification request for verifying the transfer request,
obtaining, from the blockchain entity 3, request for proof of fulfillment of one or more conditions for the transfer request to be registered, and
providing proof for fulfillment of the one or more conditions and receiving in response a verification from the blockchain entity 3.

Figure 11:
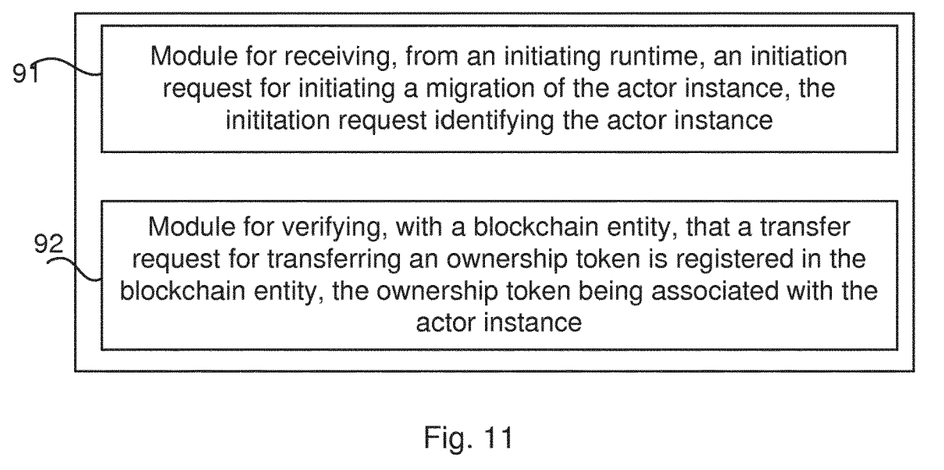
FIG. 11 illustrates a target runtime resource comprising function modules/software modules for implementing methods in accordance with the present teachings.

In various embodiments, the target runtime 2b is configured to, upon successful verification, receive the actor instance 5a1. The target runtime 2b may FIG. 11 illustrates a target runtime resource comprising function modules/software modules for implementing methods in accordance with the present teachings. The function modules can be implemented using software instructions such as computer program executing in a processor and/or using hardware, such as application specific integrated circuits (ASICs), field programmable gate arrays, discrete logical components etc., and any combination thereof. Processing circuitry may be provided, which may be adaptable and in particular adapted to perform any of the steps of the method 70 that has been described in various embodiments.

A target runtime 2b is provided for migrating an actor instance. The target runtime 2b comprises a first module 91 for receiving, from the initiating runtime, an initiation request for initiating a migration of the actor instance, the initiation request identifying the actor instance of the actor of the application. Such first module 91 may, for instance, comprise receiving circuitry for an initiation request.

The target runtime 2b comprises a second module 92 for verifying, with a blockchain entity, that a transfer request for transferring an ownership token is registered in the blockchain entity, the ownership token being associated with the actor instance of the actor of the application. Such second module 92 may, for instance, comprise comprise processing circuitry adapted to perform such verification.

It is noted that one or both of the modules 91, 92 may be replaced by units.

The invention has mainly been described herein with reference to a few embodiments. However, as is appreciated by a person skilled in the art, other embodiments than the particular ones disclosed herein are equally possible within the scope of the invention, as defined by the appended patent claims.

The invention claimed is:

1. A method performed in an initiating runtime for migrating an actor instance of an actor to a target runtime, the method comprising:
obtaining, from a blockchain entity, an ownership token associated with the actor instance of the actor, the ownership token being verifiable by a blockchain of the blockchain entity, and
using the ownership token for migrating the actor instance, wherein the using comprises:
initiating the migration of the actor instance to the target runtime by sending, to the blockchain entity, a request for registering a transfer of the ownership token to the target runtime,
verifying, with the blockchain entity, that the transfer of the ownership token is registered, and
migrating, upon successful verification, the actor instance to the target runtime by transferring the actor instance to the target runtime.

2. The method as claimed in claim 1, wherein the verifying comprises:
providing to the blockchain entity, one or more conditions that the target runtime has to fulfil for registering the transfer, and
verifying with the blockchain entity that the target runtime fulfils each of the one or more conditions.

3. The method as claimed in claim 2, wherein the verifying further comprises obtaining, from the blockchain entity, evidence proving that the target runtime fulfils each of the one or more conditions.

4. The method as claimed in claim 2, wherein the one or more conditions comprises one or more of: fulfillment of a security requirement and fulfillment of conditions relating to the handling of the actor instance.

5. The method as claimed in claim 1, comprising, prior to the obtaining, sending one or more requests to the blockchain entity requesting an entry in the blockchain for each actor instance of the actor, each of the one or more requests comprising a unique identification for a respective actor instance of the actor.

6. The method as claimed in claim 1, comprising, upon terminating an application comprising the actor, sending one or more requests to the blockchain entity for revoking each entry associated with a respective actor instance.

7. An initiating runtime for migrating an actor instance of an actor to a target runtime, the initiating runtime comprising:
a communications interface; and
processing circuitry configured to:
obtain, from a blockchain entity via the communications interface, an ownership token associated with the actor instance of the actor, the ownership token being verifiable by a blockchain of the blockchain entity, and
use the ownership token for migrating the actor instance, by:
initiating the migration of the actor instance to the target runtime by sending, to the blockchain entity, a request for registering a transfer of the ownership token to the target runtime,
verifying, with the blockchain entity, that the transfer of the ownership token is registered, and
migrating, upon successful verification, the actor instance to the target runtime by transferring the actor instance to the target runtime.

8. The initiating runtime as claimed in claim 7, wherein the processing circuitry is configured to verify that the transfer of the ownership token is registered, by:
providing to the blockchain entity, one or more conditions that the target runtime has to fulfil for registering the transfer, and
verifying with the blockchain entity that the target runtime fulfils each of the one or more conditions.

9. The initiating runtime as claimed in claim 8, wherein the processing circuitry is configured to verify that the target runtime fulfils each of the one or more conditions, by obtaining, from the blockchain entity, evidence proving that the target runtime fulfils each of the one or more conditions.

10. The initiating runtime as claimed in claim 8, wherein the one or more conditions comprises one or more of: fulfillment of a security requirement and fulfillment of conditions relating to the handling of the actor instance.

11. The initiating runtime as claimed in claim 7, wherein the processing circuitry is configured to, prior to obtaining the ownership token, send one or more requests to the blockchain entity requesting an entry in the blockchain for each actor instance of the actor, each of the one or more requests comprising a unique identification for a respective actor instance of the actor.

12. The initiating runtime as claimed in claim 7, wherein the processing circuitry is configured to, upon terminating an application comprising the actor, send one or more requests to the blockchain entity for revoking each entry associated with a respective actor instance.

13. A method, in a blockchain entity configured to maintain a blockchain in coordination with zero or more other blockchain entities, for verifying a migration of an actor instance of an actor from an initiating runtime to a target runtime, the method comprising:
providing, to the initiating runtime, an ownership token associated with the actor instance of the actor, the ownership token being verifiable by the blockchain of the blockchain entity,
verifying, upon request from the initiating runtime, a registration of a transfer of the ownership token, and
prior to the providing:
receiving, from the initiating runtime, one or more requests requesting an entry in the blockchain for each actor instance, the one or more requests comprising a unique identification for a respective actor instance of the actor, and
creating a unique blockchain entry for each actor instance based on the respective unique identification of the actor instance.

14. The method as claimed in claim 13, further comprising receiving, from the initiating runtime at least one condition to be fulfilled by a target runtime for the transfer of the ownership token to be registered.

15. The method as claimed in claim 13, further comprising registering in the blockchain a change of ownership by incorporating in the blockchain a transaction block for the transfer.

16. The method as claimed in claim 13, further comprising:
receiving, from the initiating runtime, a request for registering a transfer of the ownership token to the target runtime, and
verifying the registration of the transfer of the ownership token upon successful check of the ownership.

17. The method as claimed in claim 16, wherein the verifying comprises verifying fulfillment of at least one condition that the target runtime has to fulfil for the transfer of the ownership token to be registered.

18. A blockchain entity configured to maintain a blockchain in coordination with zero or more other blockchain entities, wherein the blockchain entity is configured for verifying a migration of an actor instance of an actor of from an initiating runtime to a target runtime, the blockchain entity comprising:
a communications interface; and
processing circuitry configured to:
provide, to the initiating runtime, an ownership token associated with the actor instance of the actor, the ownership token being verifiable by the blockchain of the blockchain entity,
verify, upon request from the initiating runtime, a registration of a transfer of the ownership token, and
prior to providing the ownership token:
receive, from the initiating runtime, one or more requests requesting an entry in the blockchain for each actor instance of the actor, the one or more requests comprising a unique identification for a respective actor instance of the actor, and
create a unique blockchain entry for each actor instance based on the respective unique identification of the actor instance.

19. The blockchain entity as claimed in claim 18, wherein the processing circuitry is configured to receive, from the initiating runtime, at least one condition to be fulfilled by a target runtime for the transfer of the ownership token to be registered.

20. The blockchain entity as claimed in claim 18, wherein the processing circuitry is configured to register in the blockchain a change of ownership by incorporating in the blockchain a transaction block for the transfer.

21. The blockchain entity as claimed in claim 18, wherein the processing circuitry is configured to:
receive, from the initiating runtime, a request for registering a transfer of the ownership token to the target runtime, and
verify the registration of the transfer of the ownership token upon successful check of the ownership.

22. The blockchain entity as claimed in claim 21, wherein the processing circuitry is configured to verify fulfillment of at least one condition that the target runtime has to fulfil for the transfer of the ownership token to be registered.

23. A method in a target runtime for migration of an actor instance of an actor from an initiating runtime to the target runtime, the method comprising:
receiving, from the initiating runtime, an initiation request for initiating a migration of the actor instance, the initiation request identifying the actor instance of the actor, and
verifying, with a blockchain entity, that a transfer request for transferring an ownership token is registered in the blockchain entity, the ownership token being associated with the actor instance of the actor, wherein the verifying comprises:
sending, to the blockchain entity, a verification request for verifying the transfer request,
obtaining, from the blockchain entity, a request for proof of fulfillment of one or more conditions for the transfer request to be registered, and
providing proof for fulfillment of the one or more conditions and receiving in response a verification from the blockchain entity.

24. The method as claimed in claim 23, further comprising, upon successful verification, receiving the actor instance.

25. A target runtime for migration of an actor instance of an actor from an initiating runtime to the target runtime, the target runtime comprising:
a communications interface; and
processing circuitry configured to:
receive, from the initiating runtime, an initiation request for initiating a migration of the actor instance, the initiation request identifying the actor instance of the actor, and
verify, with a blockchain entity, that a transfer request for transferring an ownership token is registered in the blockchain entity, the ownership token being associated with the actor instance of the actor, wherein the processing circuitry is configured to verify that the transfer request for transferring the ownership token is registered in the blockchain entity, by:
sending, to the blockchain entity, a verification request for verifying the transfer request,
obtaining, from the blockchain entity, request for proof of fulfillment of one or more conditions for the transfer request to be registered, and
providing proof for fulfillment of the one or more conditions and receiving in response a verification from the blockchain entity.

26. The target runtime as claimed in claim 25, wherein the processing circuitry is configured to, upon successful verification, receive the actor instance.

\* \* \* \* \*